(12) United States Patent
Constantinou

(10) Patent No.: US 12,553,178 B1
(45) Date of Patent: Feb. 17, 2026

(54) FIBER-BONDING LIQUID -FOR ENHANCING HAND FEEL, BREATHABILITY, AND DURABILITY OF PRINTED APPAREL

(71) Applicant: Andrew Constantinou, Altadena, CA (US)

(72) Inventor: Andrew Constantinou, Altadena, CA (US)

( * ) Notice: Subject to any disclaimer, the term of this patent is extended or adjusted under 35 U.S.C. 154(b) by 0 days.

(21) Appl. No.: 19/330,833

(22) Filed: Sep. 17, 2025

Related U.S. Application Data

(63) Continuation-in-part of application No. 19/204,377, filed on May 9, 2025.

(51) Int. Cl.
| | | |
|---|---|---|
| *D06P 1/653* | (2006.01) | |
| *D06P 1/44* | (2006.01) | |
| *D06P 1/52* | (2006.01) | |
| *D06P 5/24* | (2006.01) | |

(52) U.S. Cl.
CPC .............. *D06P 5/003* (2013.01); *D06P 1/445* (2013.01); *D06P 1/5214* (2013.01); *D06P 1/653* (2013.01); *D10B 2401/14* (2013.01)

(58) Field of Classification Search
CPC ........ D06P 5/003; D06P 1/445; D06P 1/5214; D06P 1/653; D10B 2401/14
USPC .............................................................. 8/470
See application file for complete search history.

(56) References Cited

U.S. PATENT DOCUMENTS

2010/0154146 A1* 6/2010 Shah ........................ B41M 7/00
524/386

* cited by examiner

*Primary Examiner* — Amina S Khan
(74) *Attorney, Agent, or Firm* — John Alumit

(57) ABSTRACT

A method for adhering a fiber-bonding solution for incorporating a customized image, such as a printed graphic, into a textile, such as a T-shirt or other garment includes three primary elements, an acidic organic compound, a water solvent, a polyol compound, a crosslinking agent, a hydrophobically modified polysaccharide, and a silane-modified additive, is taught. The acidic compound is an acetic acid preferably constituting between twenty and forty five percent of the solution by volume. The water solvent preferably constitutes between twenty five and forty five percent of the solution by volume. The polyol compound is a glycol preferably constituting between five and ten percent of the solution by volume.

5 Claims, 3 Drawing Sheets

Figure 1:
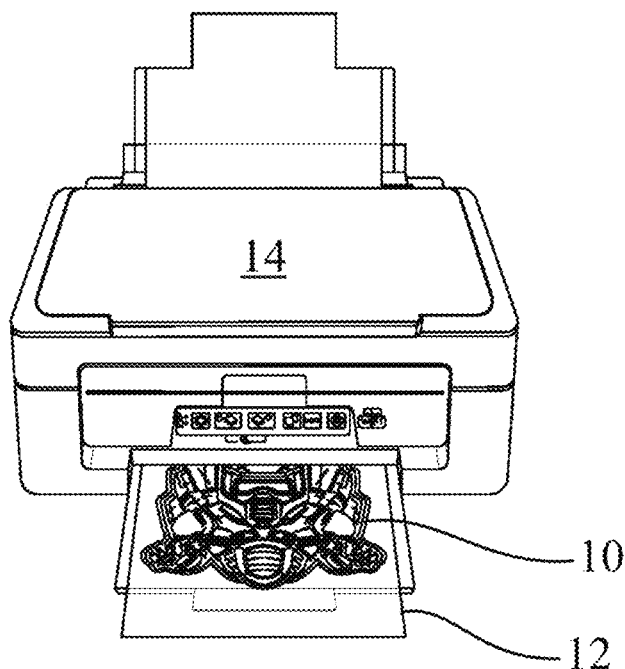

FIBER-BONDING LIQUID -FOR ENHANCING HAND FEEL, BREATHABILITY, AND DURABILITY OF PRINTED APPAREL

CROSS-REFERENCE TO RELATED APPLICATION

This application claims the benefit of the priority filing date of U.S. provisional patent application No. 63/721,574, filed on Nov. 18, 2024 and non-provisional patent application Ser. No. 19/204,377 filed on May 9, 2025.

BACKGROUND

Field of the Invention

This invention pertains generally to fabric treatment solutions designed to improve the tactile quality, breathability, and durability of printed images on apparel. It is particularly applicable to Direct to Garment (DTG), Direct to Film (DTF), White Toner Transfer (WTT), and other garment printing technologies.

Related Art

Textile, fabric, and cloth, including and various fiber-based materials which are commonly knitted, woven, bonded, etc., are typically manufactured with either a natural coloring, bleached to whiten them, or dyed a predetermined color according to preference. Textiles may also be produced to have a variety of patterns. Various textiles are manufactured for apparel. Although apparel typically includes a color or pattern, it is common for users to desire customization after sale, such as applying patterns or graphics on the apparel according to user preference. An apparel customization industry has arisen to meet this need.

In the apparel customization industry, textiles (or any fabric product) and various fiber-based materials may be imprinted with indicia, such as a design, in a variety of different ways. Commonly, screen printing is used, wherein a stencil is prepared on a fine mesh screen. Ink is then pushed through open areas of the stencil, thereby transferring the design onto the apparel, essentially "printing" the image thereon. Screen printing is time consuming and laborious since only one color at a time can be printed for multi-color designs.

As a result, alternative processes have been developed. Among these are Direct-to-Film (DTF) printing, which is a heat-transfer process involving printing designs onto a film and then transferring them to apparel, such as a t-shirt. White Toner Printing is another method for apparel, wherein a printer applies toner onto a transfer paper, and the transfer paper is applied to apparel with a high-temperature and high-pressure heat press. Another printing technique is sublimation, wherein a design is printed onto a special transfer paper using sublimation inks, which then turn into a gas when exposed to high heat from a heat press, allowing the design to permanently fuse with the fabric fibers of the clothing.

When apparel fabric is manufactured with a colors or patterns, they are incorporated into the fibers of the garment. Thus, the texture of the material is not greatly affected. In techniques where designs are applied over the apparel material, the prints lack integration with the fabric fibers and result in a thick, stiff, uncomfortable garment. Accordingly, one problem associated with printing techniques is how a customized image feels to the hand. Other problems with printing techniques in the art is a lack of surface-level adhesion, and the tendency of an applied design to prematurely fade or flake away from the fabric. These problems add material costs and reduce the comfort of printed garments.

Some products exist as a finishing sheet for sealing designs, such as DTF designs, on a garment, however these products result in a "plastic" feel when a user runs the user's fingers over the fabric. Thus, there is a need for a you run your fingers over it. Accordingly, there is a need for an apparel customization product that improves hand feel, to avoid thick, uncomfortable garments. There is also a need for a product that does not block fabric pores, thereby enhancing breathability. There is also a need for a product that reduces the amount of material used. For example, DTF printing uses excess powder or glue and results in waste and increased material costs. Finally, there is a need for a versatile product which is universally solution compatible with various printing processes. These and other problems in the art are addressed by the invention disclosed herein.

SUMMARY

A fiber-bonding solution is provided for incorporating a customized image, such as a printed graphic, into a textile, such as a T-shirt or other garment. The fiber-bonding solution includes three primary elements, an acidic organic compound, a water solvent, and a polyol compound. The acidic compound preferably constitutes between twenty and forty five percent of the solution by volume. The water solvent preferably constitutes between twenty five and forty five percent of the solution by volume. The polyol compound preferably constitutes between five and ten percent of the solution by volume.

To support application of the fiber-bonding solution to the textile, the acidic organic compound, the water solvent, and the polyol compound are blended uniformly into a homogenized liquid solution having a viscosity enabling aerosolization of the fiber-bonding solution. In various alternative embodiments, the acidic organic compound may be an acidic compound selected from the group consisting of acetic acid, citric acid, lactic acid, formic acid, malic acid, tartaric acid, oxalic acid, and benzoic acid. The water solvent may be a de-ionized water, distilled water, or otherwise purified water. The polyol compound preferably is a polyhydric alcohol having multiple hydroxyl groups, and may be a glycol.

In another preferred embodiment, the fiber-bonding solution is an acetic acid constituting between twenty and forty five percent of the solution by volume, a water solvent comprising de-ionized water constituting between twenty five and forty five percent of the solution by volume and a polyol compound comprising a glycol constituting between five and ten percent of the solution by volume, wherein the acidic organic compound, the water solvent, and the polyol compound are blended uniformly into a homogenized liquid solution having a viscosity enabling aerosolization of the fiber-bonding solution.

In this embodiment, the acetic acid is selected from the group consisting of glacial acetic acid, bromoacetic acid, and acetic anhydride, and the glycol is selected from the group consisting of ethylene glycol, propylene glycol, diethylene glycol, triethylene glycol, and polyethylene glycol.

An improved method of adhering a printed graphic to a textile is also disclosed. The method includes providing a fiber-bonding solution comprising an acidic organic compound, a water solvent, and polyol compound. The fiber-bonding solution is prepared for an aerosolized application to a surface. The printed graphic is applied to the textile. The fiber-bonding solution is then applied to the textile using the aerosolized application. A protective sheet is applied over the printed graphic, and a heat press is performed on the printed graphic through the protective sheet. In this manner, the fiber-bonding solution is heated and bonds to a plurality of fibers of the textile material.

In the improved method, the acidic organic compound may be acetic acid, the polyol compound may be a glycol, the graphic may be initially applied to the textile by preparing and using a printed transfer of the graphic to the textile, or the graphic may be printed directly onto the textile, and the protective sheet is formed of a material chosen from the list of Teflon®, kraft paper, and parchment paper.

BRIEF DESCRIPTION OF THE FIGURES

FIG. 1 illustrates a customized graphic being printed onto a transfer sheet for a DTF transfer process.

FIG. 2 illustrates a customized graphic being printed directly onto a garment.

FIG. 3 illustrates a garment and a DTF transfer sheet in the process of heat pressing to adhere a customized image to the garment.

FIG. 4 illustrates a DTF transfer sheet being removed after applying the customized image to the garment using the heat press.

FIG. 5 illustrates a fiber-bonding solution being aerosolized using a sprayer and applied to the garment and customized image.

FIG. 6 illustrates the garment bearing the customized image with the fiber-bonding solution applied undergoing a second heat press to bond the image with the garment fibers.

DESCRIPTION

The following description is presented to enable any person skilled in the art to make and use the apparatus disclosed herein and is provided in the context of a particular application and its requirements. Various modifications to the disclosed implementation will be readily apparent to those skilled in the art, and the general principles defined herein may be applied to other implementations and applications without departing from the spirit and scope of the present disclosure. Importantly, the size or configuration of the components discussed herein may be modified from the way they are depicted and described herein without departing form the spirit and scope of the claimed implementation. Thus, the present disclosure is not limited to the implementation shown but is to be accorded the widest scope consistent with the principles and features disclosed herein.

A fiber-bonding solution comprises a plurality of components including: an acidic organic compound (for example, an acetic acid), water (acting as a solvent), a polyol compound (for example, glycol), a crosslinking agent (for example, polyaziridine or a carbodiimide compound), a hydrophobically modified polysaccharide (for example, hydrophobically modified hydroxyethylcellulose (HMHEC)), and a silane-modified additive (for example, Silquest® A-187).

The acidic, organic compound, such as Acetic Acid or another chemically similar or functionally analogous acid constitutes approximately twenty to forty five percent of the fiber-bonding solution. Various acids chemically and functionally similar to acetic acid include citric acid, lactic acid, formic acid, malic acid, tartaric acid, oxalic acid, and benzoic acid, all of which share similar characteristics, although some may be stronger or weaker than acetic acid depending on their chemical structure, and the molarity or concentration of a particular acid mixture. The acidic component of the fiber-bonding solution serves to open fabric fibers and enhance ink adherence.

The second component to the fiber bonding solution, water, is used as a solvent. Water constitutes approximately twenty-five to forty five percent of the fiber-bonding solution. Water is used primarily as a dispersant, which ensures even distribution of the fiber-bonding solution. Additionally, when the fiber-bonding solution is vaporized by heat and pressure, the water component of the vapor aids in accomplishing an effective heat transfer.

The polyol compound may be a variety of similar polyol compounds having similar properties. Although a variety of polyols having multiple hydroxyl groups with similar chemical structures and properties may be used, in one preferred embodiment, glycol is used as the polyol compound. The polyol component constitutes approximately five to ten percent of the fiber-bonding solution. The polyol (glycol) is provided to soften the fabric and increase print durability by bonding a graphic or design with the fibers of the garment being customized.

The crosslinking agent, which in a preferred implementation is polyaziridin, or a compound having the carbodiimide chemical functional group (—N═C═N—) such as 1-ethyl-3-(3-dimethylaminopropyl (EDC, also known as EDAC), dicyclohexylcarbodiimide (DCC), and diisopropylcarbodiimide (DIC). The cross-linking agent enhances bonding with various fabrics. In a preferred implementation, the crosslinking agent is provided such that it comprises approximately <0.5% of the solution.

The fifth component is a hydrophobically modified polysaccharide. In a preferred implementation, hydrophobically modified hydroxyethylcellulose (HMHEC) is used. The HMHEC boosts water-resistance as well as viscosity of the solution, while maintaining strong fabric adherence. The quantity of HMHEC is added according to preference to achieve maximum adherence with a fabric.

The final component is a silane-modified additive, such as Silquest 1-187. The silane-modified additive, in concert with the other additives, boosts adhesion to fabric fibers. In one preferred implementation, the silane-modified additive is added to the solution such that it comprises approximately <1% of the solution.

The process for employing the fiber-bonding solution is incorporated into the process for applying a printed image to a garment or piece of apparel. First, a desired image is printed using a preferred process, either printing to a transfer film, sheet, or roll, as is the case with DTF printing, sublimation printing, white toner transfer printing, etc. Thereafter, the image is applied to the garment in the conventional manner, including conducting a first press to adhere the design to the garment. The fiber-bonding solution is then sprayed onto the image on the garment, either using an aerosolizing spray mechanism, or another mechanism to achieve a fine, evenly applied layer of the fiber-bonding solution on the garment. Finally, a second press is conducted with a sheet of Teflon® or kraft paper inserted between the heat press and the apparel with the printed image.

This application process results in several benefits in transfer-type printing. In a DTF printing the printed transfer sheet is preheated for five to ten seconds before an adhesive powder is applied. This reduces powder adherence and usage by approximately twenty to fifty percent, which minimizes material costs and enhances the lightness and comfort of the final printed garment. By reducing the powder adherence by twenty to fifty percent, both the weight and thickness of the print is reduced, also resulting in a more comfortable garment.

After powdering, the transfer sheet is applied to the fabric using a heat press, thereby creating a base layer for the printed image. After the heat transfer stage, the fiber-bonding solution is sprayed directly onto the printed image. As it gets applied, the solution penetrates the fabric fibers, bonding with the ink and powder, and embedding the print within the material. A secondary, brief, heat press activates the fiber-bonding solution, thereby increasing integration of the printed image into the fabric fibers. This results in a thinner, more flexible print that preserves the fabric's breathability and comfort.

In addition to the advantages to using the fiber-bonding solution in terms of reduced material cost, such as the reduction in powder and glue usage of up to fifty percent, the production of a thinner, softer, and more breathable print, using the fiber-bonding solution provides improved durability and longevity of the garment, and scalability and sustainability for commercial applications. The fiber-bonding solution chemically integrates the print with the fabric fibers, increasing wash resistance and reducing wear, cracking, and peeling. Additionally, the fiber-bonding solution's adaptable application across multiple printing stages makes it suitable for large-scale production while minimizing waste.

Figure 2:
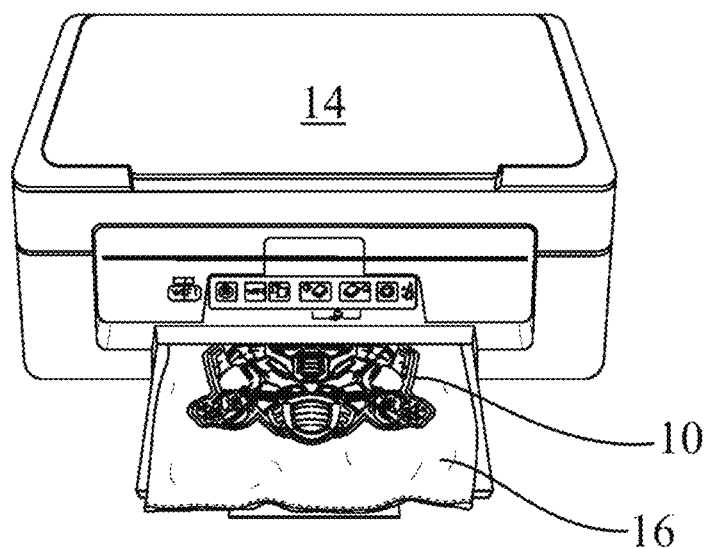

Referring to FIGS. 1 and 2, the initial stages of improved garment customization are shown. Referring to FIG. 1, a desired image 10 or graphic is printed using a conventional T-shirt or other garment customizable printing process, by printing to a transfer film 12, sheet, or roll, on a printer 14 using a process such as DTF printing, sublimation printing, white toner transfer, etc. Referring to FIG. 2, as an alternative method of image or graphic application, the image 10 or graphic may be directly printed on the garment 16 with a printer 14 using direct-to-garment printing, or another direct to textile printing process.

Figure 3:
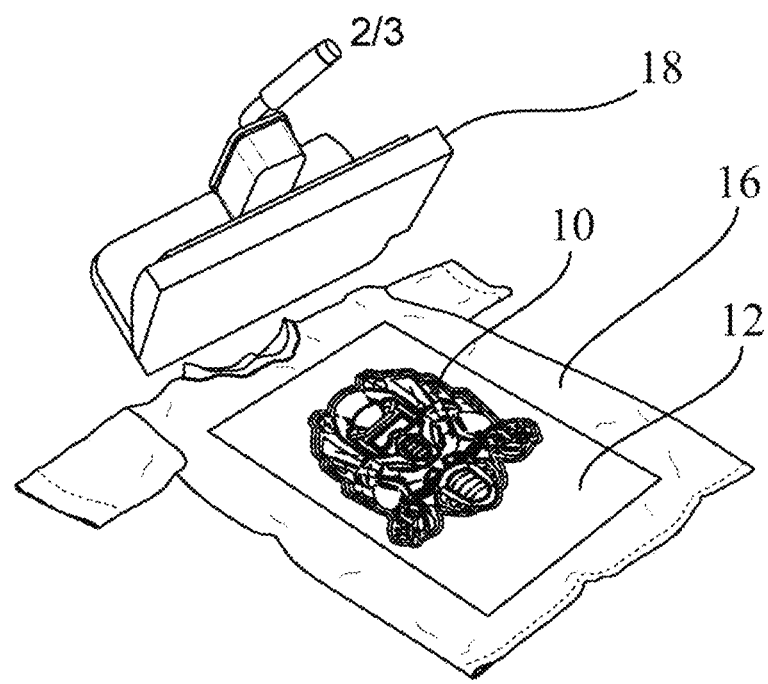

Referring to FIG. 3, in some customization processes, a transfer sheet 12 or film is used after printing. In these instances, a user will need to transfer the image 10 to the apparel 16 using a heat press 18. In conventional use, this process involves adding a protective sheet 20 (FIG. 4) of Teflon®, kraft paper, or parchment paper above the transfer sheet to avoid the printed image or graphic material adhering to the heat press.

Figure 4:
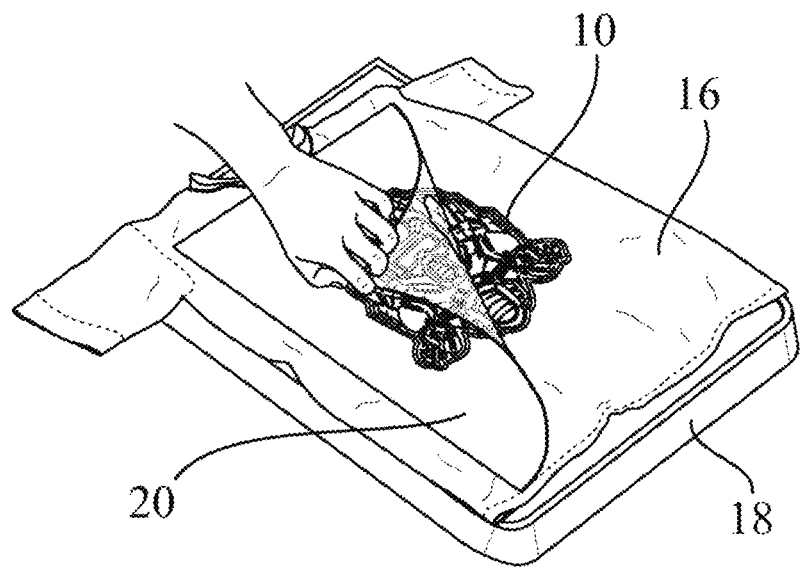

Referring to FIG. 4, in a case where a protective sheet 20 of Teflon®, kraft paper, or parchment paper, the sheet 20 is then peeled away from the garment 16 with the image 10 or graphic applied in an initial stage of image 10 application. The garment 16 is then ready for application of the fiber-bonding solution 22 (FIG. 5).

Figure 5:
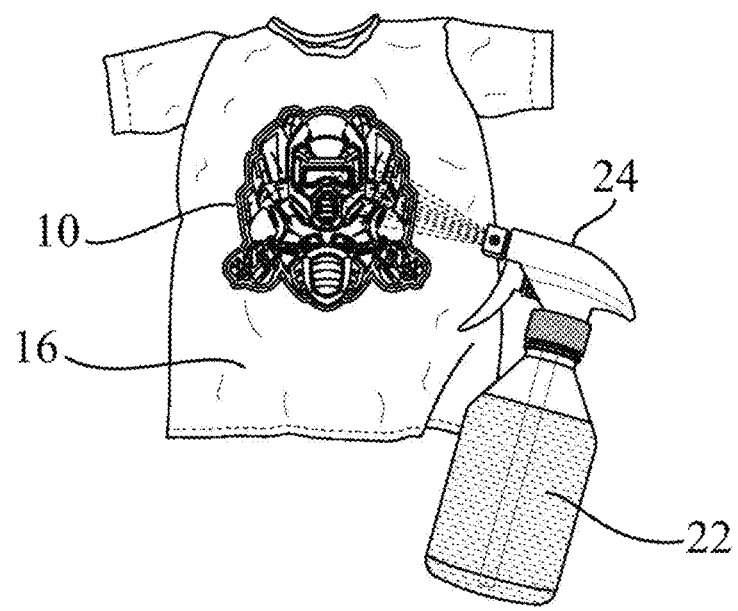

Referring to FIG. 5, the fiber-bonding solution 22 is sprayed onto the garment 16, and particularly onto the region bearing the printed image 10 or graphic. The application of the fiber-bonding solution 22 may be accomplished using a simple dispersion apparatus, such as a conventional, hand-operated spray bottle 24. Alternatively, any other dispersion technique may be used which results in an even distribution of the fiber-bonding solution 22 across the printed image 10 or graphic. In an alternative embodiment of the process, the fiber-bonding solution 22 may be applied to the back of a transfer film 12 or sheet bearing the image 10 or graphic, directly onto where the ink or other media was printed.

Figure 6:
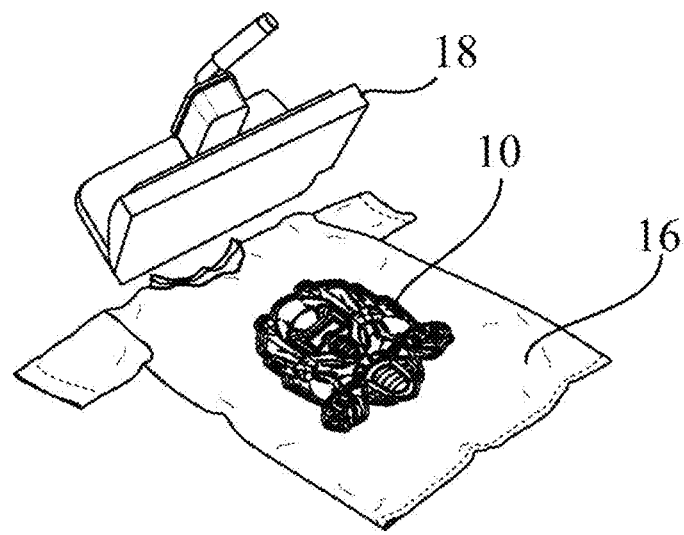

Referring to FIG. 6, after the fiber-bonding solution 22 is applied to the image 10 or graphic on the garment 16, a second press is performed with a heat press 18. For the second press, another protective sheet of Teflon®, kraft paper 20 (not shown), or parchment paper may be used between the heat press 18 and the apparel 16. This serves to prevent any of the fiber-bonding solution 22 from adhering to the surfaces of the heat press 18 as the solution 22 is heated to a vaporization point. After the second pressing, the fiber-bonding solution 22 has embedded the printed graphic or image 10 into the fibers of the garment 16, resulting in a durable, lightweight, and breathable material, which is comfortable for wearing and resists degradation across multiple laundry cycles.

The foregoing descriptions of implementations of the present disclosure have been presented only for purposes of illustration and description. They are not intended to be exhaustive or to limit the present disclosure to the forms disclosed. Accordingly, many modifications and variations will be apparent to practitioners skilled in the art. Additionally, the above disclosure is not intended to limit the present implementations disclosed herein. The scope of the present disclosure is defined by the appended claims.

What is claimed is:

1. An improved method of adhering a printed graphic to a textile, the method comprising:
   providing a fiber-bonding solution comprising an acidic organic compound, a water solvent, a polyol compound, a crosslinking agent, a hydrophobically modified polysaccharide, and a silane-modified additive;
   preparing the fiber-bonding solution for aerosolized application to the textile;
   applying the printed graphic to the textile;
   applying the fiber-bonding solution to the textile using an aerosolized application;
   applying a protective sheet over the printed graphic;
   performing a heat press on the printed graphic through the protective sheet, whereby the fiber-bonding solution is heated and bonds to a plurality of fibers of the textile material.

2. The method of claim 1, wherein the acidic organic compound is acetic acid.

3. The method of claim 1, wherein the polyol compound is a glycol.

4. The method of claim 1, further comprising the step of preparing a printed transfer of the graphic for application to the textile.

5. The method of claim 1, wherein the protective sheet is formed of a material chosen from the list of polytetrafluoroethylene, kraft paper, and parchment paper.

* * * * *